United States Patent
Uchiyama et al.

(10) Patent No.: US 8,482,780 B2
(45) Date of Patent: Jul. 9, 2013

(54) INFORMATION PROCESSING DEVICE WHICH MANAGES AN ASSOCIATION PROCESSING NETWORK FORMED BY THE IMAGE PROCESSING DEVICES

(75) Inventors: Daigo Uchiyama, Kanagawa (JP); Hiroshi Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 74 days.

(21) Appl. No.: 13/298,364

(22) Filed: Nov. 17, 2011

(65) Prior Publication Data

US 2012/0127522 A1    May 24, 2012

(30) Foreign Application Priority Data

Nov. 22, 2010 (JP) .................................. 2010-260015

(51) Int. Cl.
*G06F 3/12* (2006.01)
(52) U.S. Cl.
USPC ............... 358/1.15; 710/12; 710/15; 710/17; 710/18; 710/55; 718/106; 719/316
(58) Field of Classification Search
USPC ......... 358/1.1–3.29; 710/10–19, 55; 718/106; 719/311–332
See application file for complete search history.

(56) References Cited

U.S. PATENT DOCUMENTS

2008/0259382 A1* 10/2008 Mihara ........................ 358/1.15
2011/0016474 A1*  1/2011 Sugishita et al. ............. 719/313

FOREIGN PATENT DOCUMENTS

| JP | 2008-148109 | 6/2008 |
| JP | 2009-255390 | 11/2009 |

* cited by examiner

*Primary Examiner* — Benny Q Tieu
*Assistant Examiner* — Marcellus Augustin
(74) *Attorney, Agent, or Firm* — IPUSA, PLLC

(57) ABSTRACT

An information processing device includes a processing unit which manages an association processing network formed by image processing devices. The processing unit includes a service evaluation content generating unit which acquires requirement performance information of a service to be stored from a service requirement performance managing unit and generates an evaluation content to be evaluated for the service by including the requirement performance information in an evaluation object, a service evaluation unit which evaluates the evaluation content of the service according to a predetermined requirement, and an association object managing unit which registers the service as a new association object the evaluation content of the service the predetermined requirement of which has been met by the evaluation of the service evaluation unit.

10 Claims, 21 Drawing Sheets

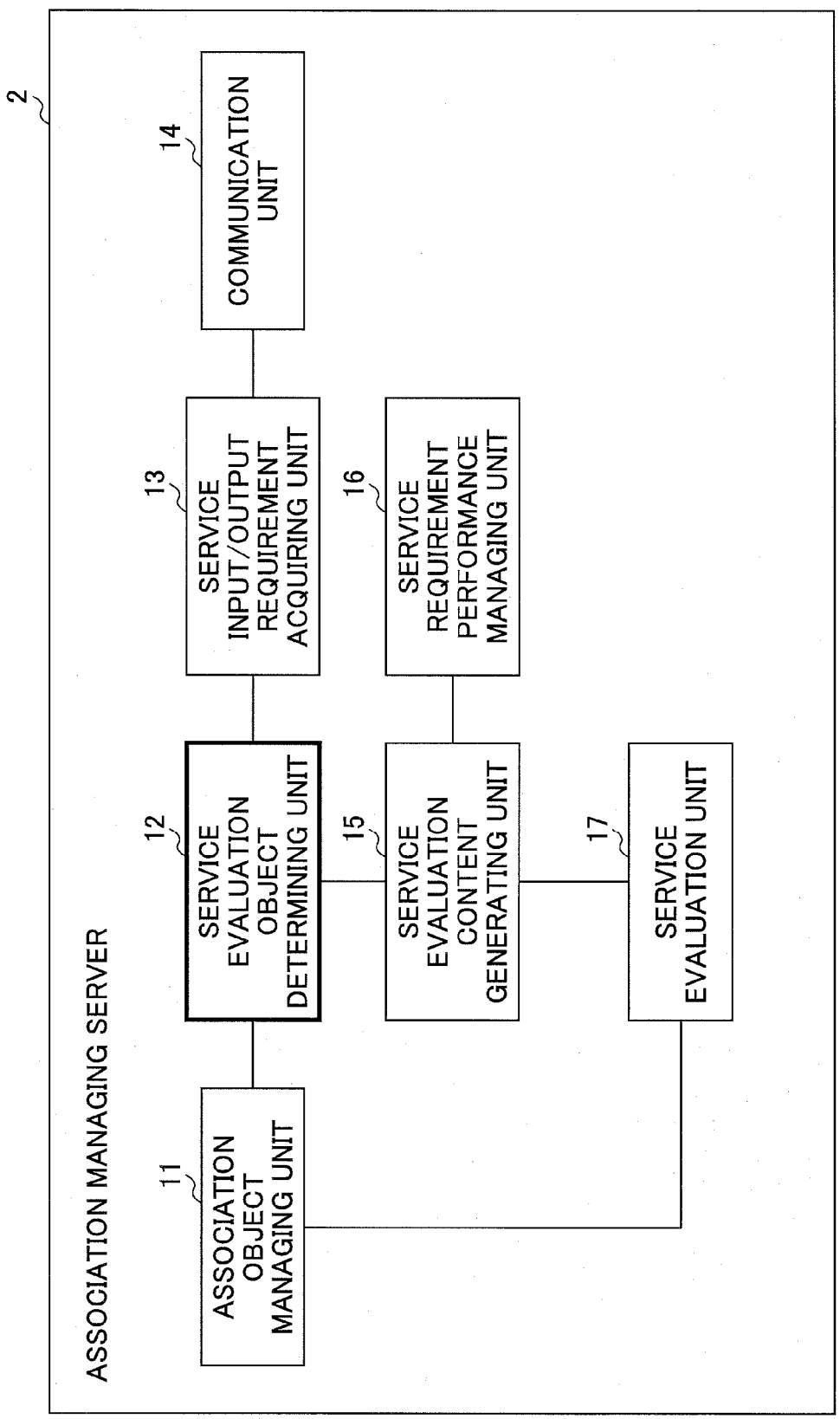

FIG.6A — 22a

| DEVICE | SERVICE | INPUT | OUTPUT |
|---|---|---|---|
| A | SCAN | – | PDF TIFF |

FIG.6B — 22b

| DEVICE | SERVICE | INPUT | OUTPUT |
|---|---|---|---|
| B | FAX TX | PDF TIFF | – |

FIG.6C — 22c

| DEVICE | SERVICE | INPUT | OUTPUT |
|---|---|---|---|
| C | OCR | PDF TIFF JPG | PDF DOC |

FIG.7

| SERVICE | ITEM | REQUIREMENT | CONDITION |
|---|---|---|---|
| OCR | ACCURACY | OVER 95% | BY USE OF TEST DATA 1 |
|  | TIME | UNDER 30 sec. | ↑ |
|  | MEMORY | OVER 2 MB | – |
| FAX TX | | | |

| SERVICE | ITEM | REQUIREMENT | CONDITION |
|---|---|---|---|
| OCR | ACCURACY | OVER 95% | BY USE OF TEST DATA 1 |
| | TIME | UNDER 30 sec. | ↑ |
| FAX TX | MEMORY | OVER 2 MB | – |

16s

| EVALUATION ENTRY NO. | DEVICE | SERVICE | INPUT | OUTPUT | REQUIREMENT 1 | REQUIREMENT 2 |
|---|---|---|---|---|---|---|
| 1 | C | OCR | PDF | PDF | ACCURACY: OVER 95% (BY USE OF TEST DATA 1) | TIME: UNDER 30 sec. (DITTO) |
| 2 | C | OCR | TIFF | PDF | ↑ | ↑ |

| SERVICE | EVALUATION PROGRAM | TEST DATA |
|---|---|---|
| OCR | test_ocr () | TEST DATA 1, 2, 3, ··· |
| SCAN | test_scan () | – |
| FAX TX | test_faxsend () | TEST DATA 2, 4, ··· |

| DEVICE | SERVICE | INPUT | OUTPUT | EXPIRATION DATE |
|--------|---------|-------|--------|-----------------|
| A | SCAN | – | PDF TIFF | 2010/10/25 |
| B | FAX TX | PDF TIFF | – | 2011/03/02 |

| DEVICE | SERVICE | INPUT | OUTPUT |
|---|---|---|---|
| A | SCAN | – | A3<br>A4<br>B5 |

FIG.16B  22b

| DEVICE | SERVICE | INPUT | OUTPUT |
|---|---|---|---|
| B | FAX TX | A4 | – |

FIG.16C  22c

| DEVICE | SERVICE | INPUT | OUTPUT |
|---|---|---|---|
| C | OCR | A4<br>B5 | A4<br>B5 |

FIG.17

| DEVICE | SERVICE | IN: FORMAT | IN: SIZE | OUT: FORMAT | OUT: SIZE |
|---|---|---|---|---|---|
| C | OCR | PDF<br>TIFF<br>JPG | A4<br>B5 | PDF<br>DOC | A4<br>B5 |

22c

INFORMATION PROCESSING DEVICE WHICH MANAGES AN ASSOCIATION PROCESSING NETWORK FORMED BY THE IMAGE PROCESSING DEVICES

BACKGROUND OF THE INVENTION

1. Field of the Invention

The present disclosure relates to an information processing device, an information processing method, and a recording medium.

2. Description of the Related Art

It is known that an association function can be performed by combining the services provided by network devices which are connected together via a network. For example, an OCR (optical character recognition) service provided by a certain device (A) can be performed by not only the device (A) but also other devices which are connected to the device (A) via a network. An association function to scan a document and perform an OCR process can be performed by combining a scanning service provided by a device (B) and the OCR service provided by the device (A). There is known a method of evaluating such an association function on a service receiving device which makes use of the services provided by the network devices.

However, the known service evaluation method does not provide an evaluation result in which the input/output requirements of the services provided are taken into consideration. The input/output requirements are necessary conditions for performing the service input and output operations. For example, in a case of the OCR service, one of the input requirements is that an image with an image format which is one of PDF (portable document format), TIFF (tagged image file format), and JPG (joint photographic expert group) is to be received as the input image. In this case, however, the service receiving device which uses the OCR service does not necessarily use all the input image formats of PDF, TIFF, and JPG. If the evaluation is performed without taking the input/output requirements of the service into consideration, the evaluation process may be performed for services which are not used by the service receiving device. Consequently, there is a problem that an unnecessary evaluation process is performed.

To eliminate the problem, various proposals have been made. For example, see Japanese Laid-Open Patent Publication No. 2008-148109.

Japanese Laid-Open Patent Publication No. 2008-148109 discloses an image processing device which registers other image processing devices to be associated with the image processing device via a network. When a new image processing device is connected on the network, the image processing device acquires function information indicating the functions of the new image processing device and compares the acquired function information with its own function information. When a new image processing device having new functions which are not included in its own function information is connected on the network, the image processing device registers the new image processing device.

However, there is no disclosure in Japanese Laid-Open Patent Publication No. 2008-148109 of evaluating only the services used and making the evaluation process into the necessary minimum in order to solve the above problem.

SUMMARY OF THE INVENTION

In one aspect, the present disclosure provides an information processing device, an information processing method, and a recording medium which are capable of making the evaluation process to the necessary minimum level when adding a new device to an association processing network.

In an embodiment which solves or reduces one or more of the above-mentioned problems, the present disclosure provides an information processing device including a processing unit to manage an association processing network formed by a plurality of image processing devices, the processing unit including: a service input/output requirement acquiring unit to acquire input/output requirements of services provided by the plurality of image processing devices; a service requirement performance managing unit to store requirement performance information of services registered as association objects in the network; a service evaluation object determining unit to perform a matching process which matches input/output requirements of a service of a device to be newly registered in the network with the input/output requirements of the services already registered in the network and determine as an evaluation object a combination of input/output requirements used for the service from among all the input/output requirements of the service to be newly registered; a service evaluation content generating unit to acquire requirement performance information of the service to be newly registered from the service requirement performance managing unit, and generate an evaluation content to be evaluated for the service by including the requirement performance information in the evaluation object; a service evaluation unit to evaluate the evaluation content of the service from the service evaluation content generating unit according to a predetermined requirement; and an association object managing unit to register the service as a new association object with the evaluation content the predetermined requirement of which has been met by the evaluation of the service evaluation unit.

Other objects, features and advantages of the present disclosure will become more apparent from the following detailed description when read in conjunction with the accompanying drawings.

BRIEF DESCRIPTION OF THE DRAWINGS

FIG. 4 is a block diagram showing the composition of an association managing server.

FIGS. 6A, 6B and 6C are diagrams showing examples of service input/output requirements.

FIG. 7 is a diagram showing an example of service requirement performance information.

FIG. 12 is a diagram for explaining the requirement performance information application processing.

FIG. 13 is a diagram showing an evaluation program management table which is stored by a service evaluation unit.

FIG. 15 is a diagram showing an example of a registered service table.

FIGS. 16A, 16B and 16C are diagrams showing an example in which an image size is used as the service input/output requirement.

FIG. 17 is a diagram showing an example in which a plurality of requirements are used as the service input/output requirements.

DETAILED DESCRIPTION OF THE PREFERRED EMBODIMENTS

In a network environment in which services of a plurality of devices are associated via a network, when an association function is performed, the services which can be associated with the association managing server in the same network are detected. In order to register a service of a device in the association managing server, it is necessary that the association managing server evaluates the service and passes the same.

According to the present disclosure, when adding a device newly, the input and output requirements of the service of the device being added are matched with the input and output requirements of the services already registered in the association managing server, and only the combinations of services which may be associated are evaluated.

According to the present disclosure, when adding a new association object device to a network, only the services to be used can be evaluated and the evaluation process can be made to the necessary minimum level.

A description will be given of embodiments of the present disclosure with reference to the accompanying drawings.

Figure 1:
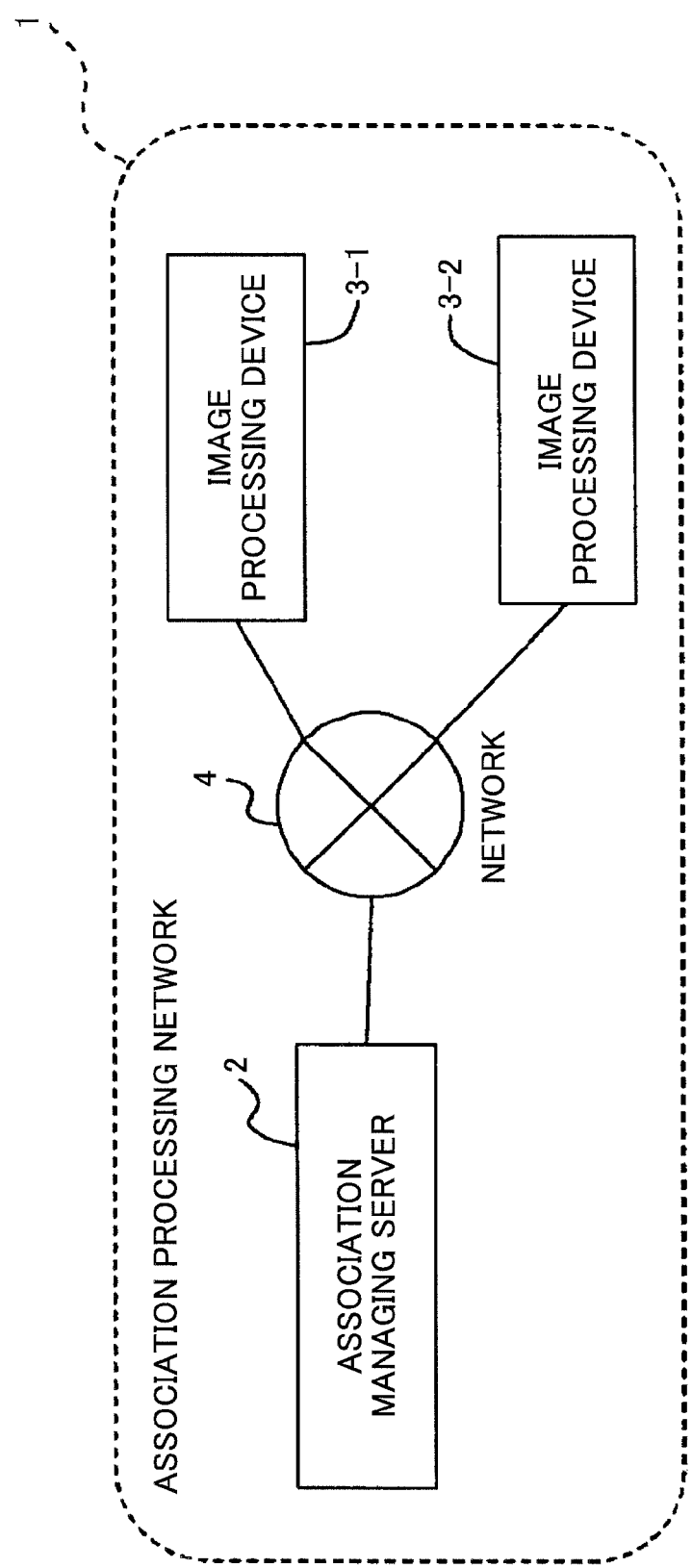
FIG. 1 is a diagram showing the composition of an association processing network managed by an association managing server which is an information processing device of an embodiment of the present disclosure.

FIG. 1 is a diagram showing the composition of an association processing network managed by an association managing server which is an information processing device of a first embodiment of the present disclosure.

As shown in FIG. 1, in the association processing network 1, an association managing server 2 (see FIG. 4) and one or more image processing devices 3-1 and 3-2 (see FIG. 5) are connected together via a network 4.

When performing an association function with the other image processing device 3-2, the image processing device 3-1 asks the association managing server 2 to discover association object services which are provided by the other image processing device 3-2. It is necessary that the association object services have already been registered in the association managing server 2, and, at the time of registration, evaluation is performed for each service to determine that the service has the performance needed for an association object service in the association processing network 1.

Figure 2:
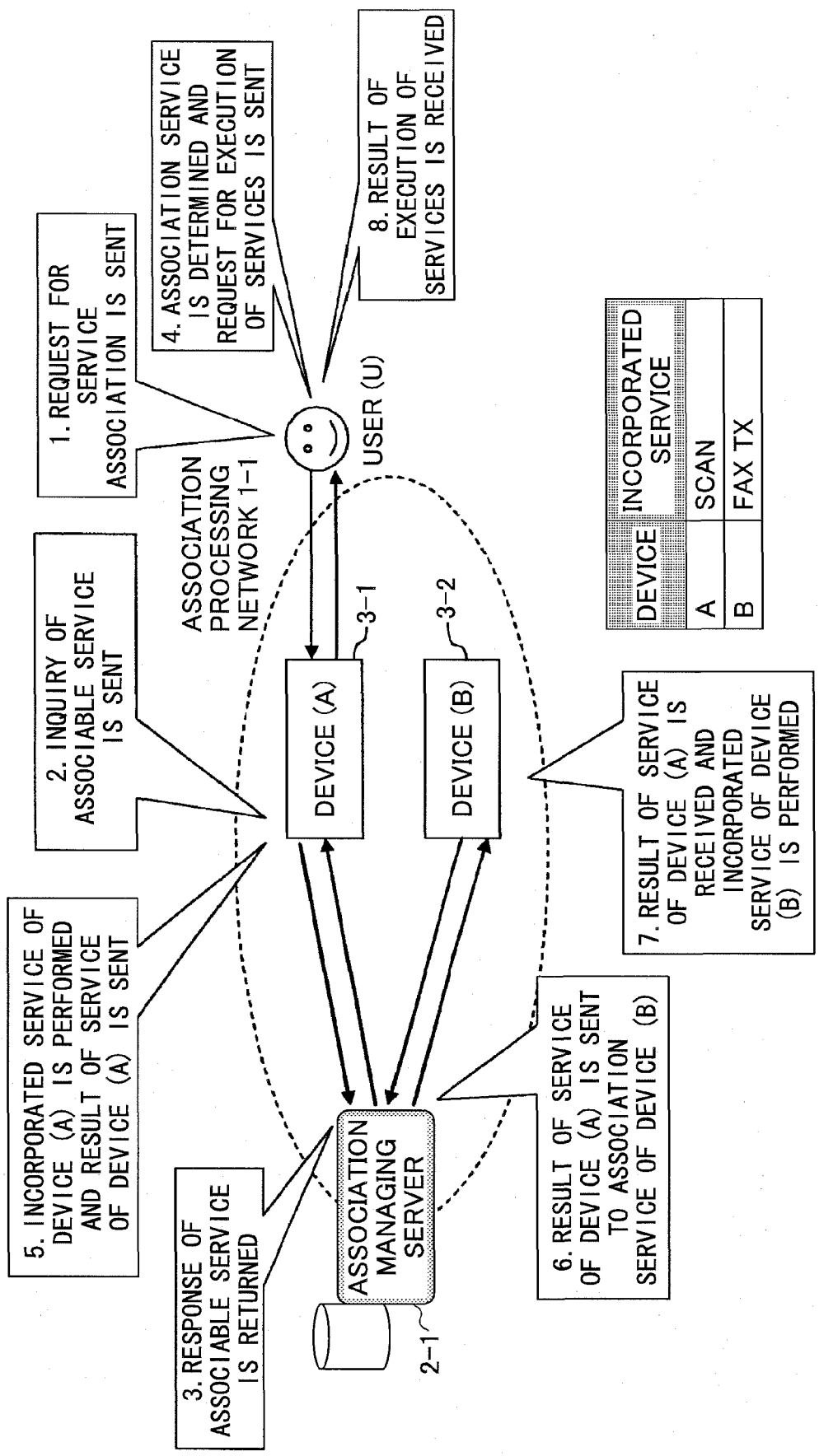
FIG. 2 is a diagram for explaining the manner in which an association service is provided in an association processing network.

FIG. 2 is a diagram for explaining the manner in which an association service is provided in an association processing network 1-1. In FIG. 2, a device (A) 3-1 and a device (B) 3-2 are image processing devices, and these devices are registered in the association processing network 1-1 managed by a server 2-1 which is the association managing server. As the association object services, the device (A) 3-1 provides a scanning service and the device (B) 3-2 provides a fax transmitting service, and these services of the devices are registered in the server 2-1.

An association flow is illustrated in FIG. 2, in which a device user (U) operates the device (A) 3-1, and a result of execution of the scanning service of the device (A) 3-1 is input to the fax transmitting service of the device (B) 3-2. In FIG. 2, the elements which are the same as corresponding elements in FIG. 1 are designated by the same reference numerals and a description thereof will be omitted. The association flow in FIG. 2 will now be described.

1. The device user (U) operates the device (A) 3-1 and requests a service association with the scanning service of the device (A) 3-1.

2. The device (A) 3-1 asks the server 2-1 to discover the services which are associable with the scanning service of the device (A) 3-1.

3. For the association object services registered, the server 2-1 discovers the services which are associable with the scanning service of the device (A) 3-1, and returns the result to the device (A) 3-1. In this example, the fax transmitting service of the device (B) 3-2 is returned.

4. The device (A) 3-1 presents to the device user (U) the reply result of the server 2-1. The device user (U) selects the scanning service of the device (A) 3-1 and the service of the received reply result to determine an association service, and requests execution of the association service. In this example, the association of the scanning service of the device (A) 3-1 with the fax transmitting service of the device (B) 3-2 is determined and a request for execution thereof is sent.

5. The device (A) 3-1 performs its own scanning service, and requests the server 2-1 to pass the result of execution of the scanning service to the fax transmitting service of the device (B) 3-2.

6. The server 2-1 passes the received result of execution of the scanning service of the device (A) 3-1 to the fax transmitting service of the device (B).

7. The device (B) 3-2 performs its own fax transmitting service by using the received result as the input.

8. The device (B) 3-2 returns the result of execution of the fax transmitting service to the server 2-1, the server 2-1 passes the same to the device (A) 3-1, and the device (A) 3-1 notifies the device user (U) of both the result of execution of its own scanning service and the result of execution of the fax transmitting service of the device (B) 3-2.

Figure 3:
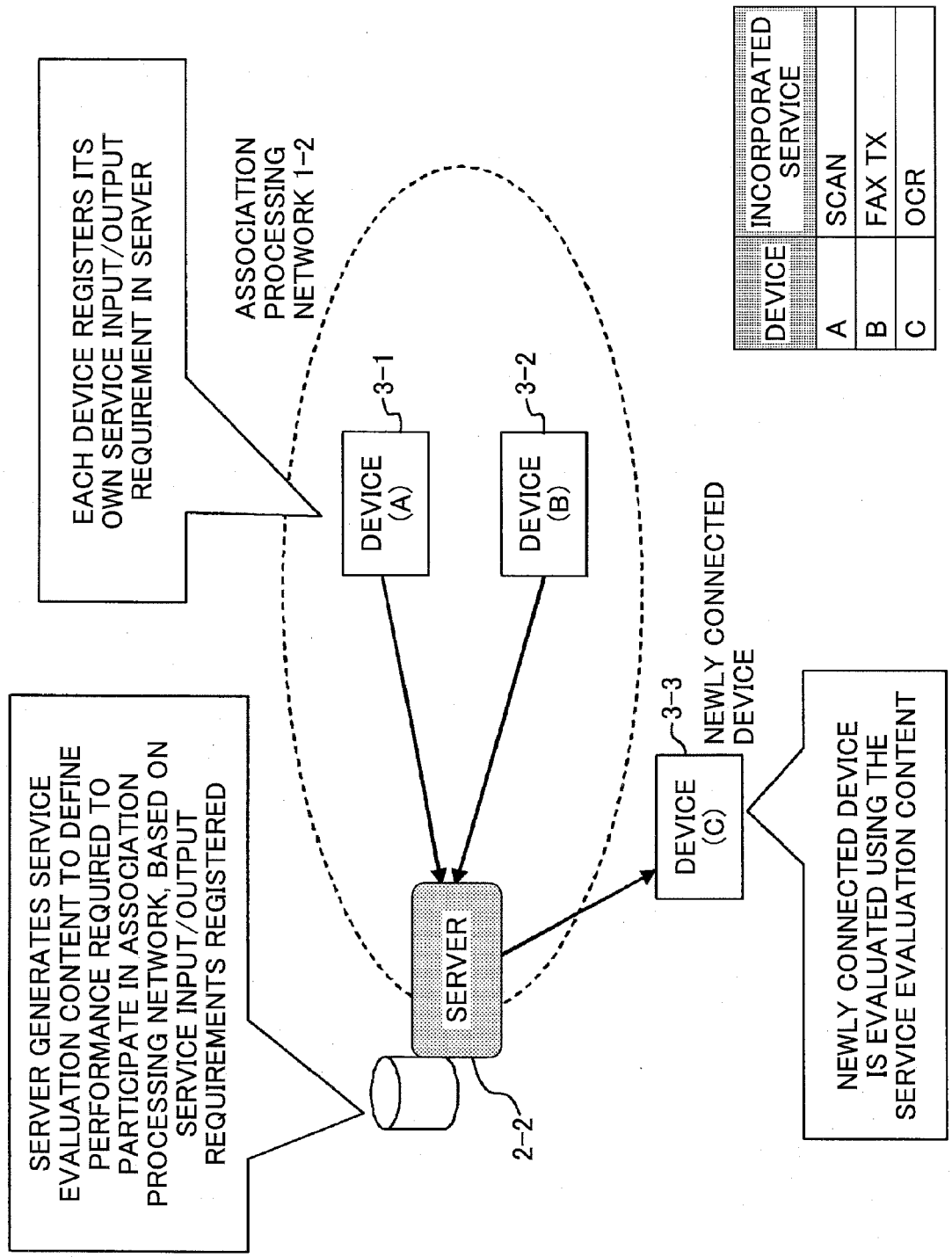
FIG. 3 is a diagram for explaining the manner in which a new image processing device is added to an association processing network.

FIG. 3 is a diagram for explaining the manner in which a new image processing device 3-3 is added to an association processing network 1-2.

When the new image processing device 3-3 is added to the association processing network 1-2, the association managing server (2-2) evaluates the performance of the service provided by the image processing device 3-3 to be added. The evaluation process is performed based on the service evaluation content generated by the association managing server (2-2). The service evaluation content is generated based on the service input/output requirements of the services of the image processing devices 3-1 to 3-3 in the association processing network 1-2 (refer to FIG. 6), in order to define the performance needed for the association object service in the association processing network 1-2. The information processing device of this embodiment is characterized by the generation of the service evaluation content by the association managing server (2-2).

In the example of FIG. 3, the OCR service of the device (C) 3-3 is newly added to the association processing network 1-1 constituted by the device (A) 3-1, the device (B) 3-2, and the server (2-1) as shown in FIG. 2. As shown in FIG. 3, the server (2-2) generates the service evaluation content based on the input/output requirements of the services provided by the device (A) 3-1 and the device (B) 3-2, respectively, and evaluates the service of the device (C) 3-3 based on the generated service evaluation content.

Next, generation of the service evaluation content will be described.

FIG. 4 is a block diagram showing the composition of an association managing server 2. The association managing server 2 is constructed to include an association object managing unit 11, a service evaluation object determining unit 12, a service input/output requirement acquiring unit 13, a communication unit 14, a service evaluation content generating unit 15, a service requirement performance managing unit 16, and a service evaluation unit 17.

The service input/output requirement acquiring unit 13 acquires the service input/output requirements from each image processing device through the communication unit 14. The service input/output requirements will be described later with reference to FIG. 6.

The service requirement performance managing unit 16 manages the service requirement performance information that defines the performance required for the services of the image processing devices participating in the association processing network managed by the association managing server (2). The service requirement performance information will be described later with reference to FIG. 7.

The service evaluation object determining unit 12 checks and compares the input/output requirements of the already registered services and the input/output requirements of the service of the device newly registered in the association processing network, and determines only the combinations of input/output requirements that are actually used, from among the input/output requirements of the newly registered service, as being evaluation objects.

The service evaluation content generating unit 15 adds the required performance information for each service included in the combination determined as being evaluation objects, and generates the service evaluation content for each service.

The service evaluation unit 17 performs the evaluation process for each service in accordance with the service evaluation content generated by the service evaluation content generating unit 15.

The association object managing unit 11 manages a list of the registered services having passed the evaluation process. The communication unit 14 connects the association managing server 21 to the network and performs communication with the image processing device via the network.

Figure 5A:
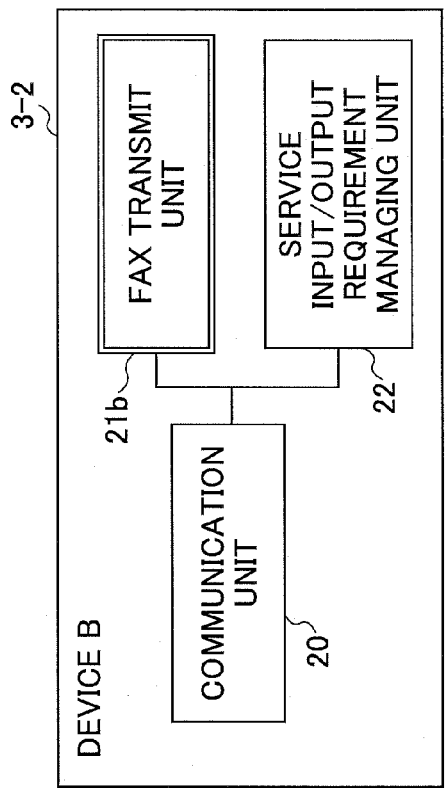
FIGS. 5A, 5B and 5C are diagrams for explaining the composition of image processing devices.
Figure 5B:
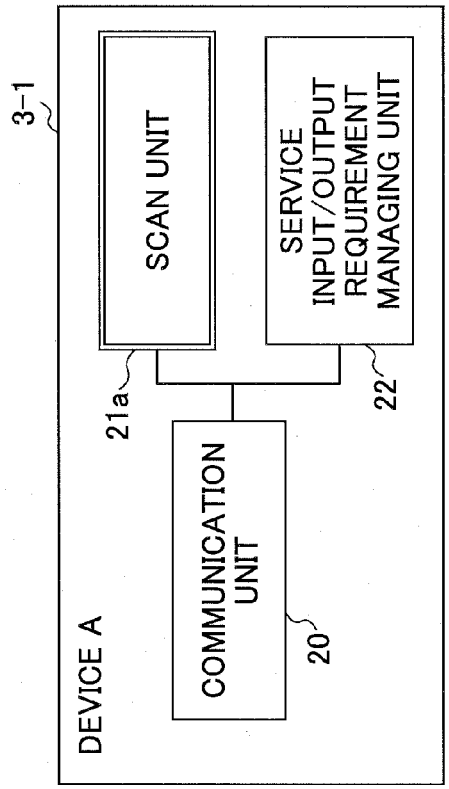
Figure 5C:
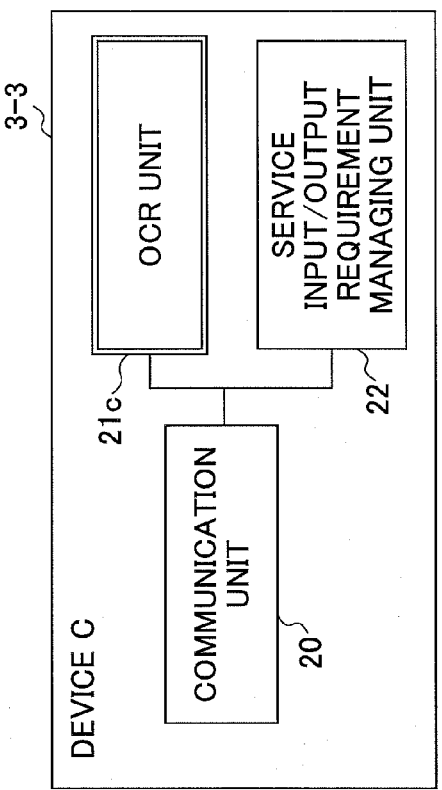

FIGS. 5A, 5B and 5C are diagrams for explaining the composition of image processing devices 3-1, 3-2 and 3-3. As shown in FIG. 5A, the device (A) 3-1 is constructed to include a communication unit 20, a service input/output requirement managing unit 22, and a scan unit 21a to perform the scan service of the device (A) 3-1. As shown in FIG. 5B, the device (B) 3-2 is constructed to include a communication unit 20, a service input/output requirement managing unit 22, and a fax transmit unit 21b to perform the fax transmitting service of the device (B) 3-2. As shown in FIG. 5C, the device (C) 3-3 is constructed to include a communication unit 20, a service input/output requirement managing unit 22, and an OCR unit 21c to perform the OCR service of the device (C) 3-3.

The communication unit 20 of each image processing device connects the image processing device to the network and performs communication with the association managing server via the network. The service input/output requirement managing unit 22 of each image processing device stores the service input/output requirements of services provided by the image processing device. The service input/output requirements will be described later with reference to FIG. 6.

The scan unit 21a, the fax transmit unit 21b, and the OCR unit 21c have respective functions to perform the respective services provided by the image processing devices.

FIGS. 6A, 6B and 6C are diagrams showing examples of the service input/output requirements. The service input/output requirements include a list of the formats of input data (INPUT) that can be received by respective services, and a list of the formats of output data (OUTPUT) that can be output by respective services.

In this embodiment, the format of image data is defined as being the input or output format IN/OUT. Alternatively, image sizes (A3, A4, B5, etc.) that can be used respective services may be defined as the service input/output requirements (see FIG. 16). Alternatively, the format of image data and the image size in combination may be used instead (see FIG. 17).

The input/output requirements 22a of the scanning service provided by the device (A) are shown in FIG. 6A, the input/output requirements 22b of the fax transmitting service provided by the device (B) are shown in FIG. 6B, and the input/output requirements 22c of the OCR service provided by the device (C) are shown in FIG. 6C.

The scanning service does not receive the input data from other services in an association process. The input/output requirements 22a include no input requirements but include the output requirements of PDF and TIFF.

The fax transmitting service receives the input data in the format of PDF or TIFF but does not output data to other services in an association process. The input/output requirements 22b include no output requirements but include the input requirements of PDF and TIFF.

The OCR service receives the input data in the format of PDF, TIFF or JPG and outputs data in the format of PDF or DOC to other services in an association process. The input/output requirements 22c include the input requirements of PDF, TIFF and JPG and the output requirements of PDF and DOC.

Figure 8:
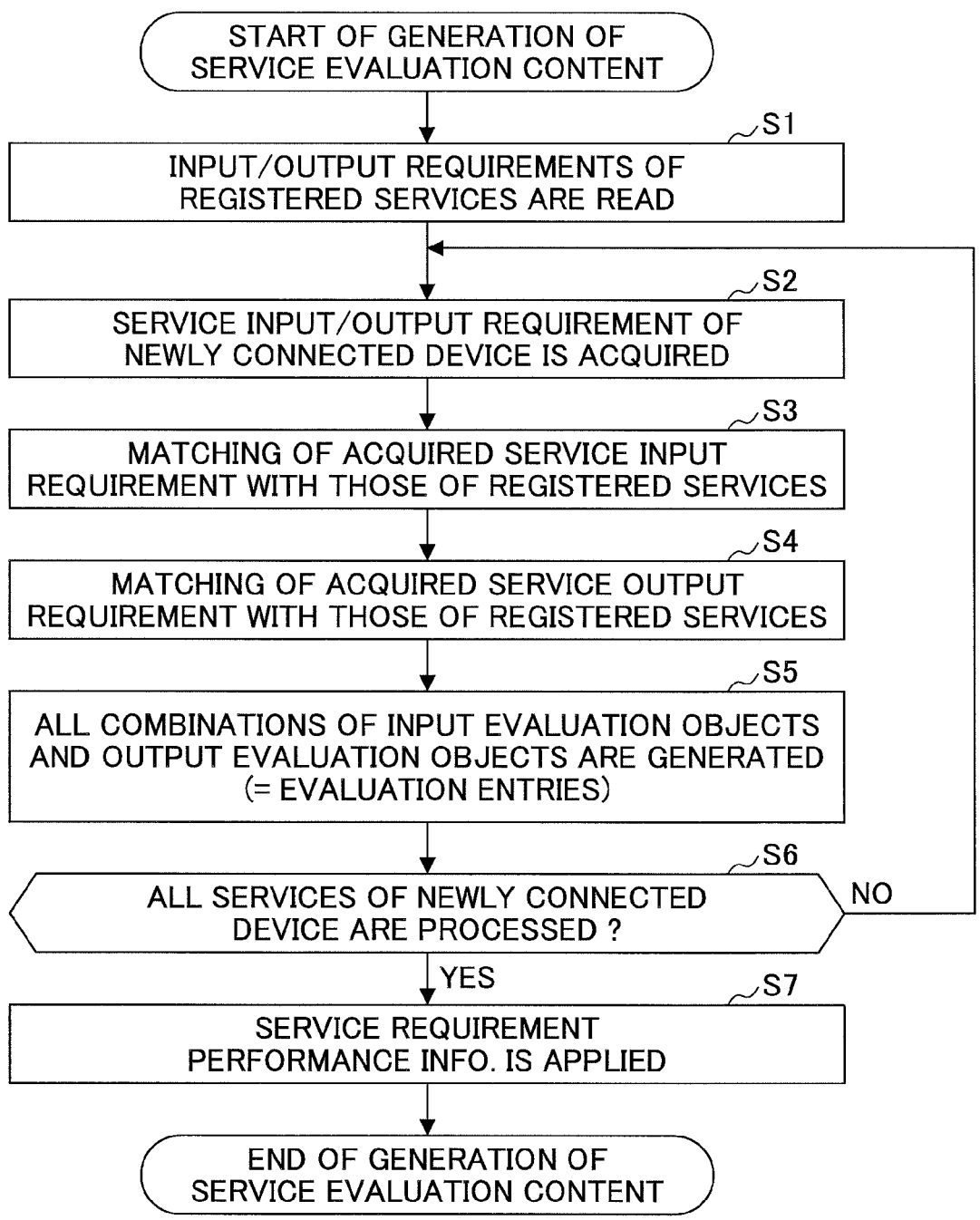
FIG. 8 is a flowchart for explaining a process of generation of the service evaluation content.
Figure 9A:
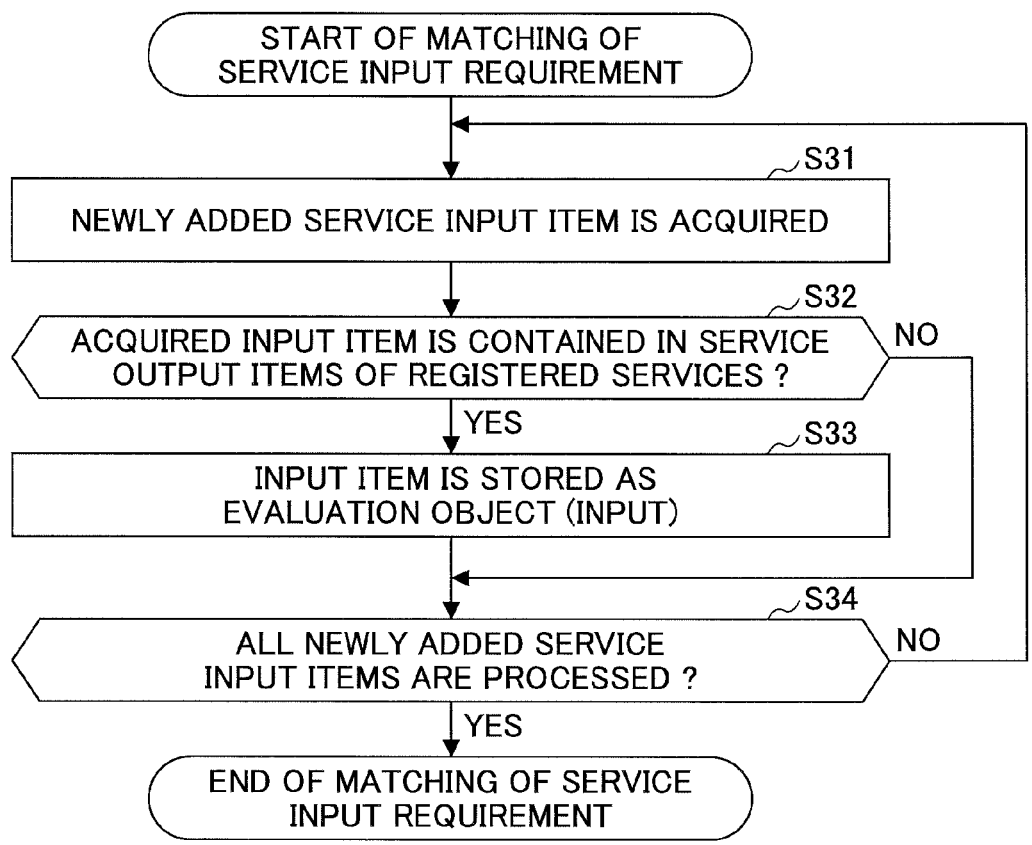
FIGS. 9A and 9B are flowcharts for explaining the input requirement matching processing and the output requirement matching processing in the flowchart of FIG. 8 respectively.
Figure 9B:
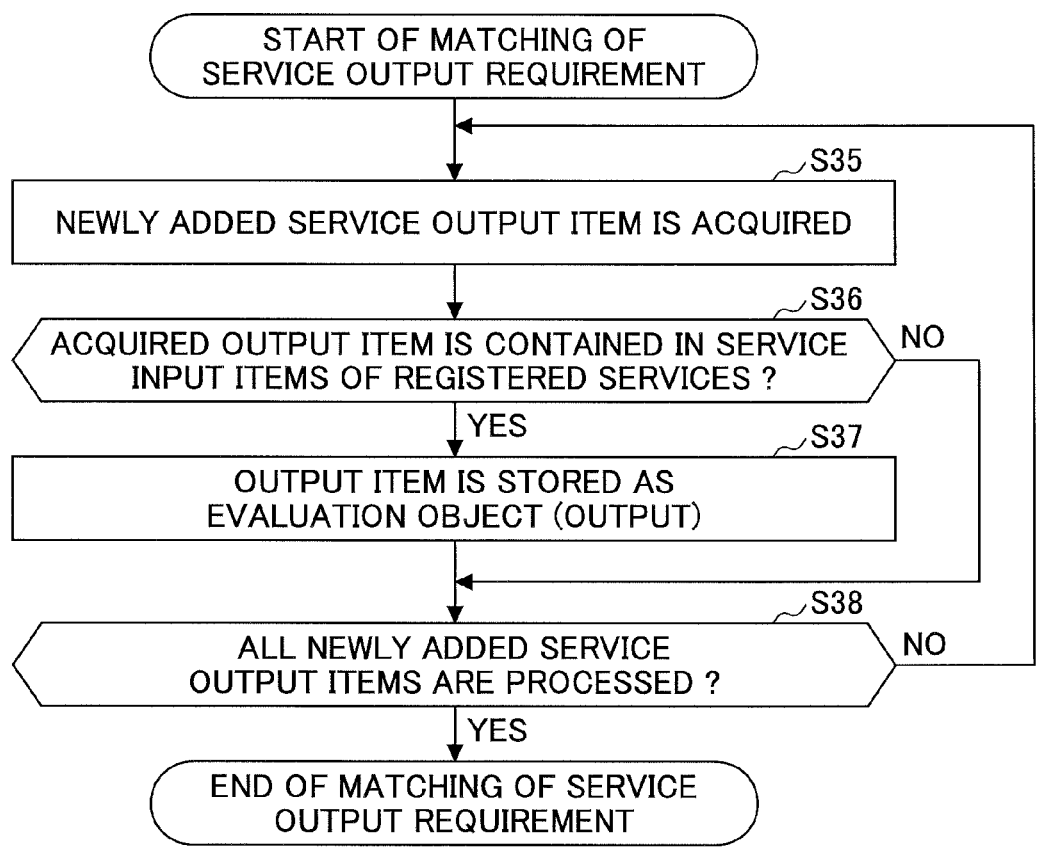
Figure 10:
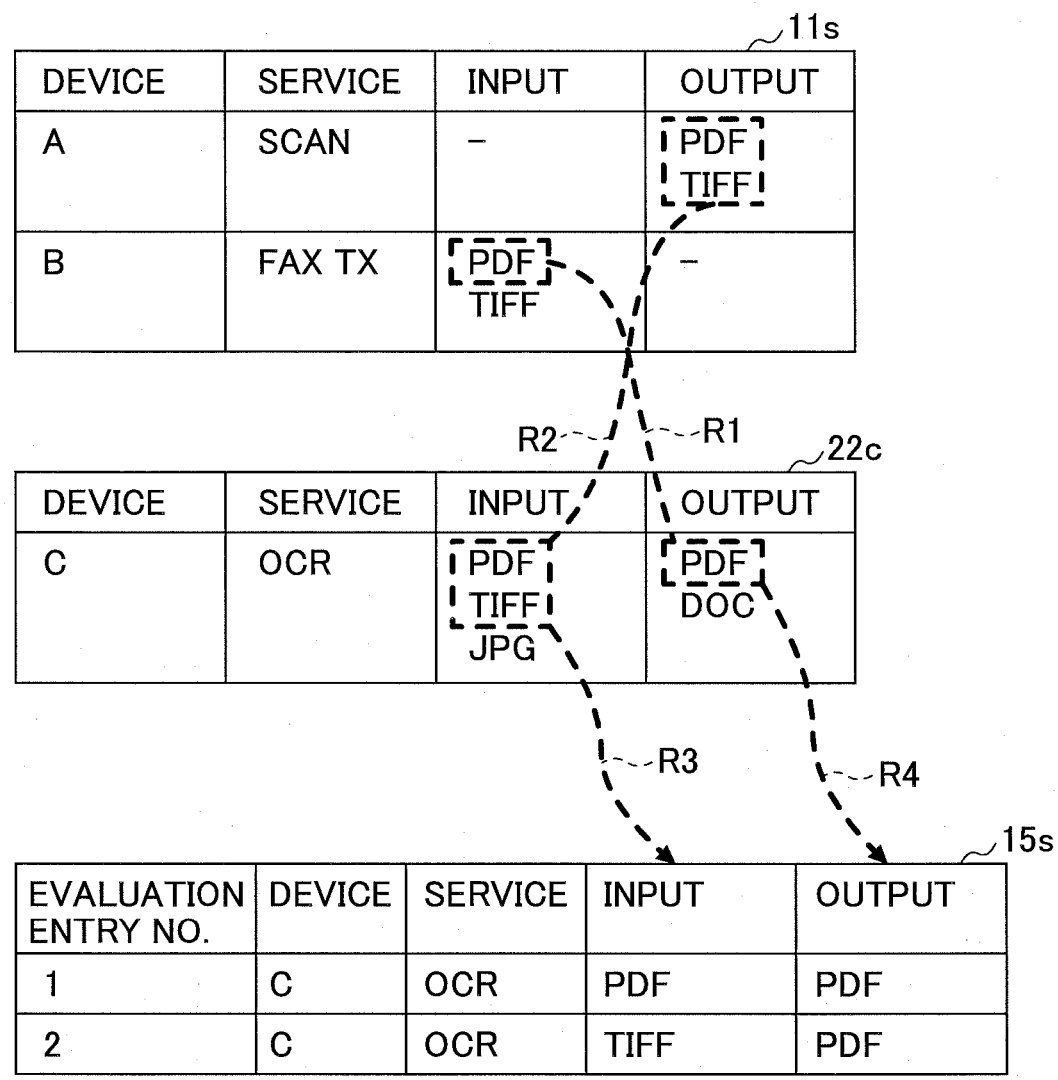
FIG. 10 is a diagram for explaining the input/output requirement matching processing.

These service input/output requirements are transmitted to the association managing server 2 through the communication unit and used by the service evaluation object determining unit 12 (see FIGS. 8-10).

FIG. 7 is a diagram showing an example of the service requirement performance information 16s. As shown in FIG. 7, the service requirement performance information 16s is stored by the service requirement performance managing unit 16, and the association managing server 2 defines the requirement value of the performance required for each service of an image processing device. In the service requirement performance information 16s, one or more items are provided for each service, and the requirement and the condition are defined for each item.

Specifically, in the example of FIG. 7, the requirement and the condition for the "accuracy" item of the OCR service process are specified as being "over 95%" and "by use of test data 1", and the requirement and the condition for the "time" item of the OCR service process are specified as being "under 30 seconds" and "by use of test data 1". Further, in the example of FIG. 7, the requirement for the "memory" item of the fax transmitting service is specified as being "over 2 MB" of the available memory space.

The service requirement performance information 16s may also include information of a service which does not exist in the association processing network. In the case of FIG. 3, the OCR service does not currently exist in the association processing network 1-2 (which service is about to be added to the network). Even in this case, the service requirement performance information of the OCR service may be stored as shown in FIG. 7. It is necessary that the service requirement performance information of the service which does not currently exist is stored beforehand in the association managing server, or such information is manually input to the server before adding the service to the network.

Figure 11:
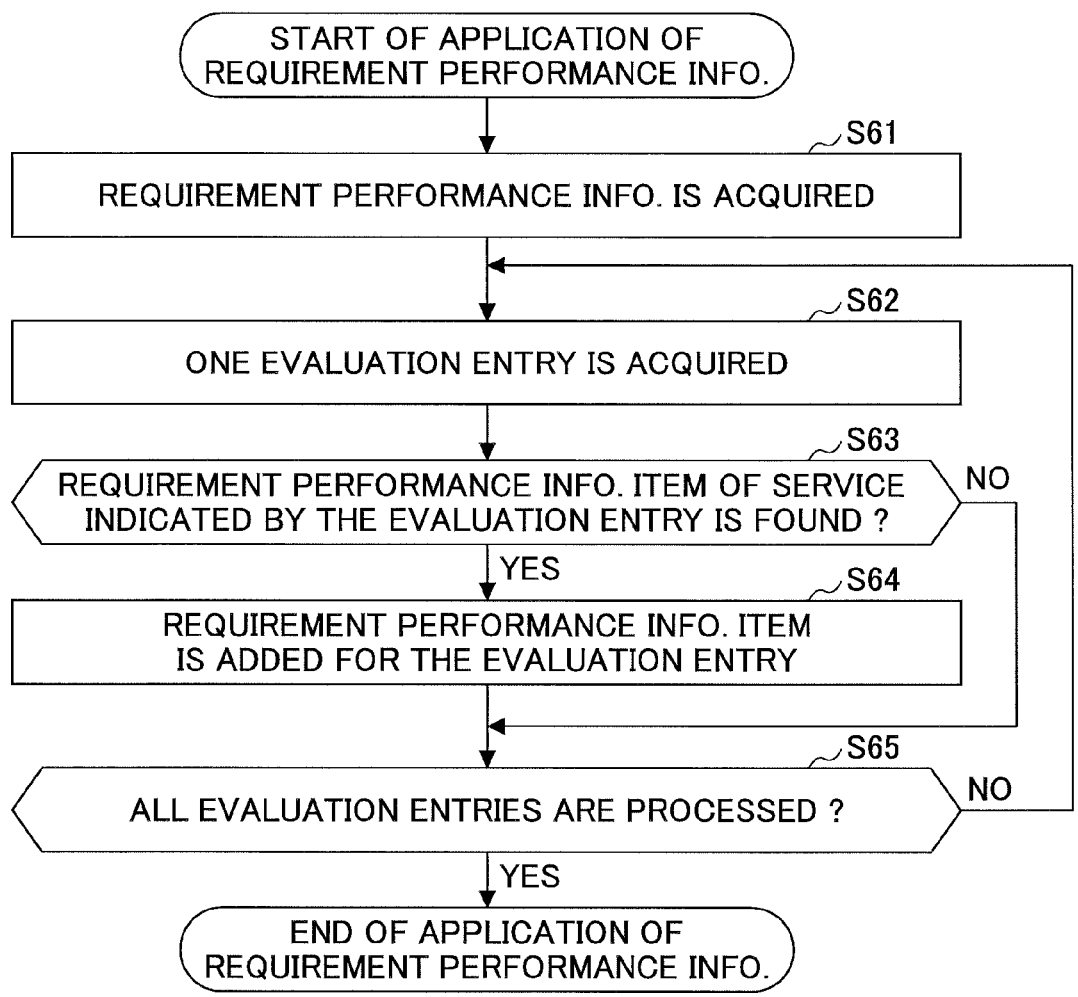
FIG. 11 is a flowchart for explaining the processing of requirement performance information application in the flowchart of FIG. 8.

The service requirement performance information 16s is read out by the service evaluation content generating unit 12 and used as a part of the service evaluation content (see FIG. 11 and FIG. 12).

FIG. 8 is a flowchart for explaining a process of generation of the service evaluation content. The process of generation of the service evaluation content is executed by a CPU (central processing unit) of the association managing server which is not illustrated. Specifically, the service evaluation object determining unit 12 and the service evaluation content generating unit 15, which are constituted by the CPU of the association managing server, carry out the process in the flowchart of FIG. 8. Execution of the process in the flowchart of FIG. 8 is started when a device is newly connected to and participates in the association processing network.

Step S1: reads the input/output requirements of the registered services. The input/output requirements of the registered service are stored in the association object managing unit 11, and all the input/output requirements of the services stored in the association object managing unit 11 are read out.

Step S2: acquires the service input/output requirements of the device to be newly registered. The service input/output requirement acquiring unit 13 acquires the requirements from the device which is about to newly participate in the association processing network.

Steps S3 and S4: perform matching of the acquired service input/output requirements with the input/output requirements of the registered services, and extract the evaluation object of each input and output requirement.

Step S5: generates the combinations of the evaluation objects of input requirements and the evaluation objects of output requirements. Each of the combinations is called an evaluation content entry.

Step S6: determines whether the processing of steps S2-S5 is performed for all the services provided by the devices. That is, when it is determined that there is no other service the processing of which is not performed (step S6/Yes), the control progresses to step S7. When it is determined that there is any other service the processing of which is not performed (step S6/No), the control is transferred to step S2.

Step S7: applies the service requirement performance information to the evaluation content entry and generates the final service evaluation content.

Accordingly, the service evaluation content are generated by the above processing.

FIGS. 9A and 9B are flowcharts for explaining the input requirement matching processing and the output requirement matching processing in the flowchart shown in FIG. 8.

As shown in FIG. 9A, the input requirement matching processing is performed as follows.

Step S31: acquires one item of the service input requirements to be newly added.

Steps S32, S33: determine whether the acquired input item is included in the registered service input items. When the acquired input item is included (step S32/Yes), it is stored as an evaluation object of the input requirement at step S33. This step is ignored when the acquired input item is not included (step S32/No).

Step S34: determines whether the processing of steps S31-S33 is performed for all the service input items to be newly added. That is, the process is ended when there is no other service input item the processing of which is not performed (step S34/Yes). When there is any other service input item the processing of which is not performed (step S34/No), the control is transferred to step S31.

The output requirement matching processing in FIG. 9B is performed as follows.

Step S35: acquires one item of the service output requirement to be newly added.

Step S36: determines whether the acquired output item is included in the registered service output items. When the acquired output item is included (step S36/Yes), it is stored as an evaluation object of the output requirement. This step is ignored when the acquired output item is not included (step S36/No).

Step S37: determines whether the processing of steps S35-S36 is performed for all the items of the service output requirements to be newly added. That is, the process is ended when there is no other output item the processing of which is not performed (step S38/Yes). When there is any other output item the processing of which is not performed (step S38/No), the control is transferred to step S35.

FIG. 10 is a diagram for explaining the input/output requirement matching processing. FIG. 10 shows the situation of the input/output requirement matching processing when adding the device (C) 3-3 shown in FIG. 3.

In the input/output requirements 22c of the OCR service of the device (C) 3-3 which is to be newly registered, PDF, TIFF and JPG are provided as the input requirement (indicated by the dotted line R3) and PDF and DOC are provided as the output requirement (indicated by the dotted line R4).

On the other hand, in the registered services 11s, only PDF and TIFF (from the scanning service of the device (A) 3-1, as indicated by the dotted line R2) can be used as the output requirement. There is no item of using JPG as the output requirement in the registered services 11s. Further, in the registered services 11s, only PDF (from the fax transmitting service of the device (B) 3-2, as indicated by the dotted line R1) can be used as the input requirement. There is no item of using DOC as the input requirement in the registered services 11s.

Namely, in the association processing network, there is no opportunity for the input of the OCR service to use JPG, and there is no opportunity for the output of the OCR service to use DOC.

The input requirements include two items and the output requirement includes one item as contents of service evaluation for the OCR service of the device (C), which result in two items in total. Specifically, the combination of PDF→PDF of evaluation entry No. 1 and the combination of TIFF→PDF of evaluation entry No. 2 will be generated.

FIG. 11 is a flowchart for explaining the process of application of the requirement performance information in the flowchart shown in FIG. 8.

The process of application of the requirement information is performed by the service evaluation content generating unit 15.

Step S61: acquires the requirement performance information 16s from the service requirement performance managing unit 16.

Step S62: acquires one evaluation content entry generated by the service evaluation object determining unit 12.

Step S63: determines whether the requirement performance information corresponding to the service which is indicated by the evaluation content entry exists.

When the requirement performance information exists (step S63/Yes), the requirement performance information is added to the evaluation content entry as a requirement value and the evaluation content entry is fixed at step S64.

When there is no requirement performance information (step S63/No), the addition of the requirement value is not performed, and it is fixed as the evaluation content entry for which the combination of input/output requirements is simply checked as being possible.

Step S65: determines whether the processing of steps S62-S64 is performed for all the evaluation content entries. That is, the process is ended when there is no other evaluation entry the processing of which is not performed (step S65/Yes). When there is any other evaluation entry the processing of which is not performed (step S65/No), the control is transferred to step S62.

FIG. 12 is a diagram for explaining the requirement performance information application processing. FIG. 12 shows the situation of the requirement performance information application processing when adding the device (C) 3-3 in FIG. 3.

As shown in FIG. 12, in the requirement performance information 16s, the OCR service includes two items of accuracy and processing time which are set as requirement values. The service evaluation contents 15s (of the OCR service) include two evaluation entries No. 1 and No. 2 each of which includes two requirement values. When performing the evaluation, it is checked whether the two requirement values of each entry are satisfied.

For example, through the process of FIG. 11, it is determined as the evaluation contents of the evaluation entry No. 1 that, when inputting PDF data into the OCR service of the device (C) and outputting PDF data from the OCR service of the device (C), the accuracy is over 95% and the processing time is under 30 seconds (indicated by the dotted line R5).

Next, a second embodiment of the present disclosure will be described.

FIG. 13 is a diagram showing an evaluation program management table 18 which is stored in the service evaluation unit 17. The evaluation program management table 18 matches and manages the evaluation program used for evaluation for each service, and the test data used for evaluation. The service evaluation unit 17 takes out the evaluation program and test data corresponding to the service evaluated based on this table. The evaluation of service is performed because the service evaluation unit executes the evaluation program by checking the result.

Figure 14:
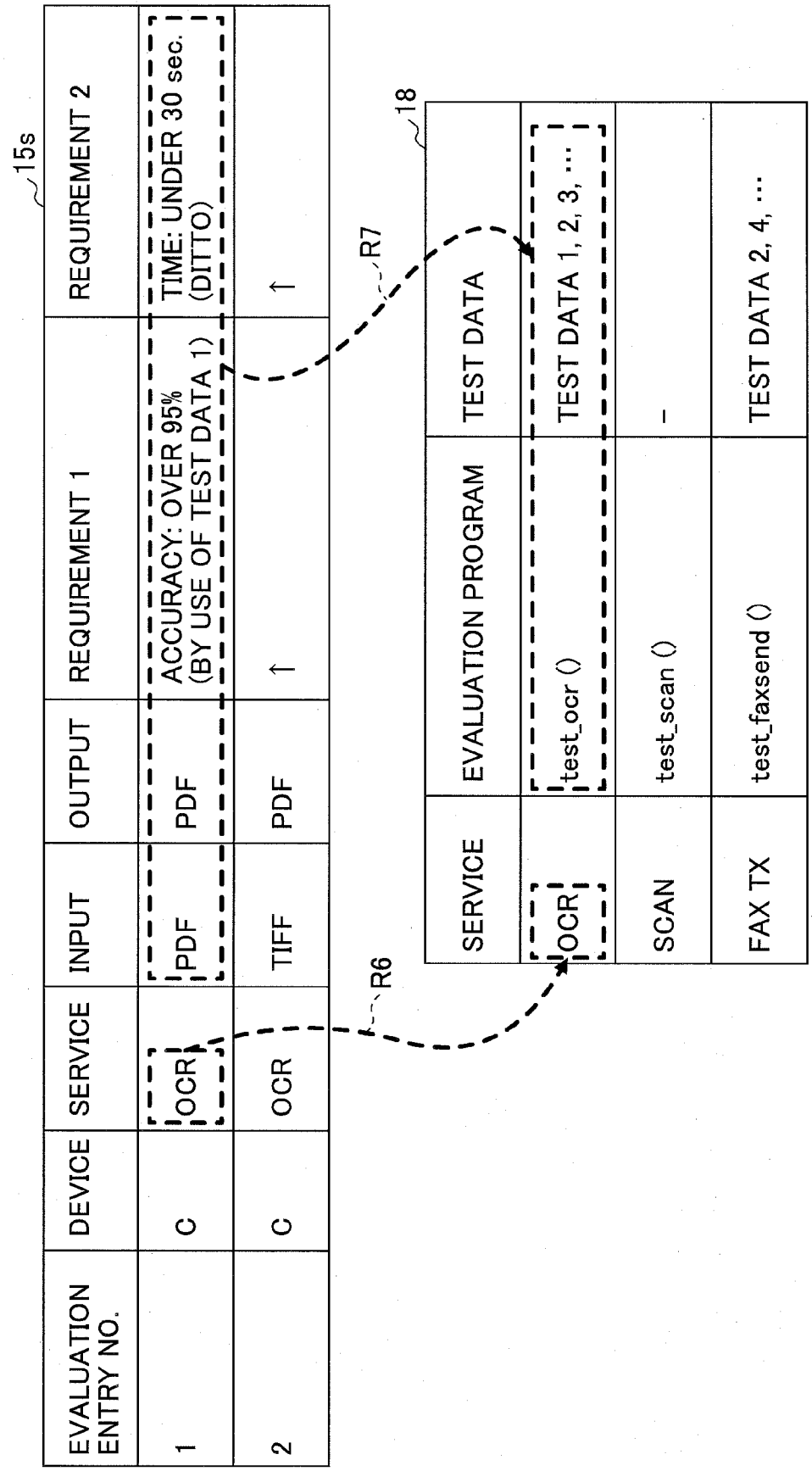
FIG. 14 is a diagram for explaining the manner in which an evaluation program to be used is determined based on the service evaluation content.

FIG. 14 is a diagram showing the situation in which the evaluation program used based on the service evaluation content is determined. Because the service to evaluate is shown for each evaluation content entry of the service evaluation content, the service evaluation unit acquires the corresponding evaluation program from an evaluation program management table.

Because the conditions (input and output requirement values) are shown for each evaluation content entry, these are input as parameters of the evaluation program. When the test data is specified, the corresponding test data is chosen from the test data definition of the evaluation program management table, and it is used during the execution of the evaluation program (indicated by the dotted lines R6 and R7).

The evaluation program is executed and if the result satisfies the conditions shown in the evaluation content entry, the service will be registered in the association object managing unit 11 as the association service.

Next, a third embodiment of the present disclosure will be described.

FIG. 15 is a diagram showing an example of a registered service table. The registered service table 11s shown in FIG. 15 is a list of the services which have passed the evaluation and have been registered as association objects in the association object managing unit 11. In the registered service table 11s, the input/output requirements of each service are summarized. The registered service table 11s is used as comparison information in the input/output requirement matching processing at the time of registering a new service as shown in FIG. 9 and FIG. 10.

As shown in FIG. 15, in the registered service table 11s, an expiration date is set up in addition to the input/output requirements. This expiration date indicates the period of time during which the registration of each service is valid. The association object managing unit 11 checks the expiration date of each service in the registered service table 11s. If any service the expiration date of which is invalid is found, the service evaluation content will be generated and the service will be evaluated similar to the process when registering a new service.

Accordingly, it can be determined whether each service maintains the performance as an association object when the number of image processing devices having participated in the association processing network is increased or when the image processing device that provides the service has changed (upgrading of the service or changing of the device setting).

Next, a fourth embodiment of the present disclosure will be described.

FIGS. 16A, 16B and 16C are diagrams showing an example in which an image size is used as the input/output requirement. In the previous example of FIGS. 6A-6C, the image format which can be output and input is used as the input/output requirement. However, as shown in FIGS. 16A-16C, the image size may be used as the input/output requirement, in addition to the image format.

Specifically, FIG. 16A shows that the scanning service of the device (A) uses the output image size of A3, A4 or B5. FIG. 16B shows the fax transmitting service of the device (B) uses the input image size of A4. FIG. 16C shows that the OCR service of the device (C) uses the input image size of A4 or B5 and the output image size of A4 or B5.

Even when the input/output requirements other than the image format are adopted, the input/output requirement matching processing is performed according to the flowcharts of FIG. 8 and FIGS. 9A-9B.

Next, a fifth embodiment of the present disclosure will be described.

FIG. 17 is a diagram showing an example of the service input/output requirements which specified a plurality of requirements.

In each of the input/output requirements of FIG. 6 only one requirement (the image format) is specified. In each of the input/output requirements of FIG. 17, a plurality of requirements (the image format and the image size) are specified.

The respective requirements can be combined independently of each other. For example, as shown in FIG. 17, the input/output requirements of the OCR service of the device (C) include "PDF:A4", "PDF:B5", "TIFF:A4", "TIFF:B5", "JPG:A4" and "JPG:B5" which can be used as the input requirement, and include "PDF:A4", "PDF:B5", "DOC:A4" and "DOC:B5" which can be used as the output requirement.

Figure 18A:
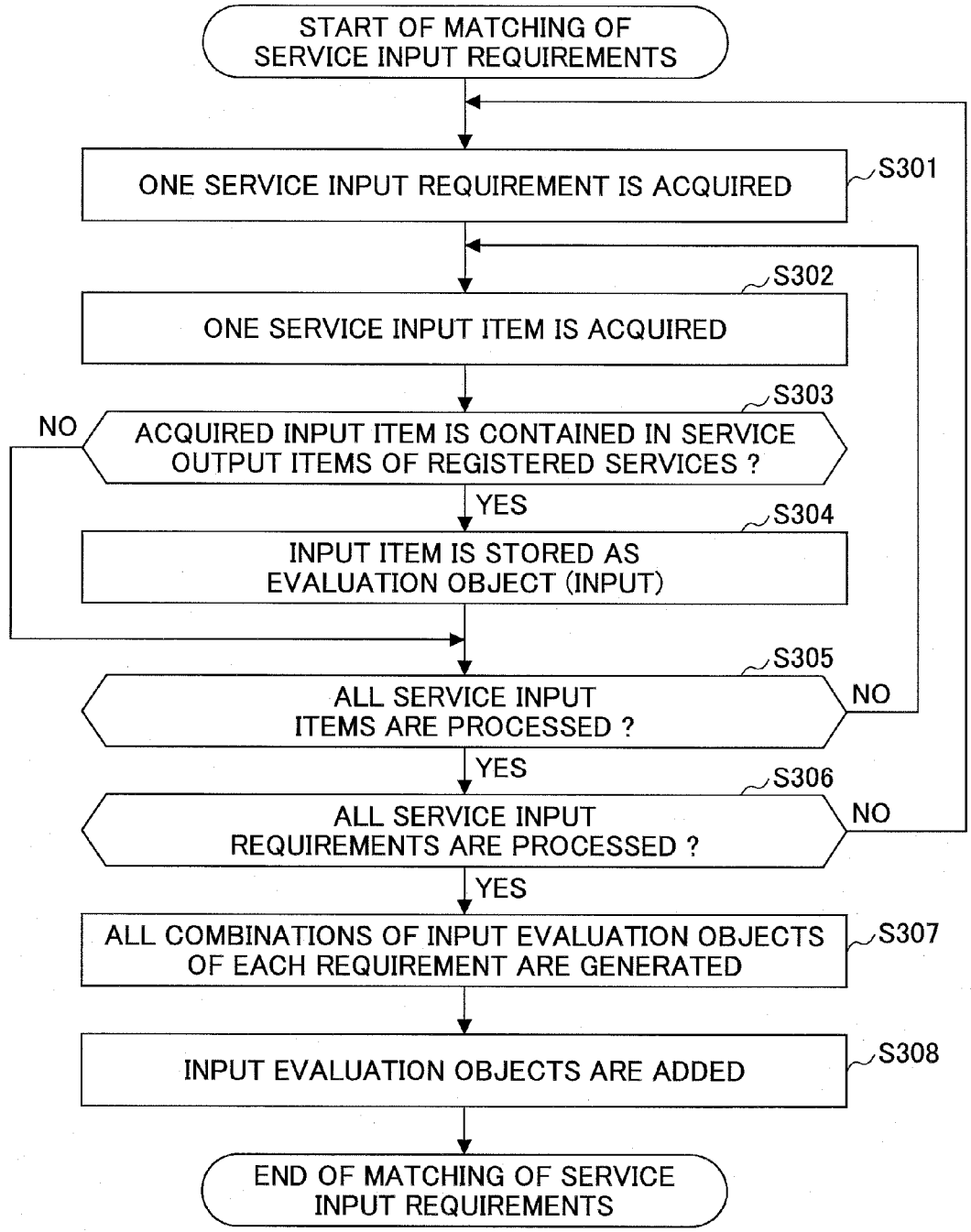
FIGS. 18A and 18B are flowcharts for explaining the input/output requirement matching processing when a plurality of service input/output requirements are specified.
Figure 18B:
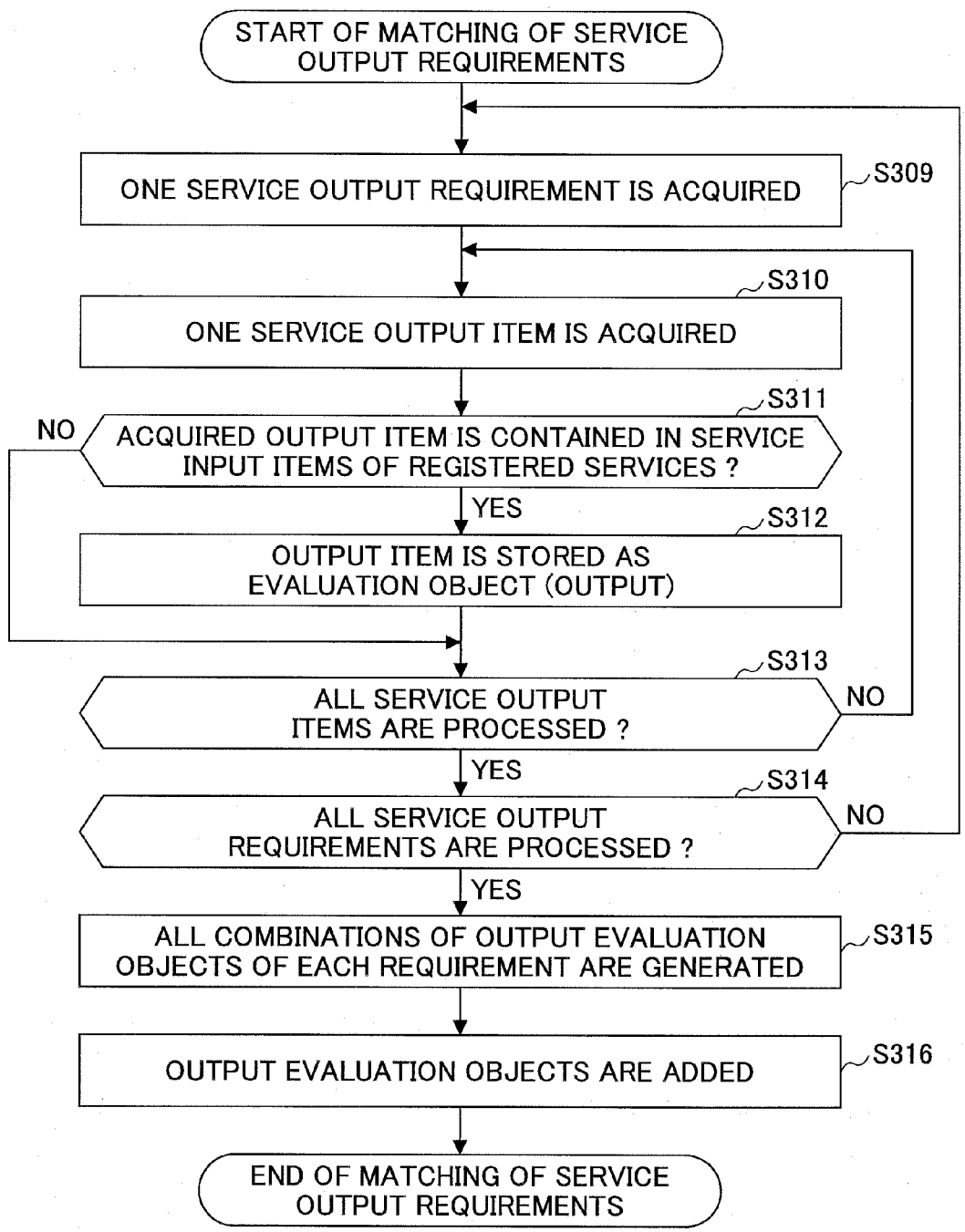

FIG. 18A and FIG. 18B are flowcharts for explaining the input/output requirement matching processing when a plurality of service input/output requirements are specified.

The flowcharts of FIGS. 18A and 18B correspond to the input/output requirement matching processing shown in FIG. 9 which is modified to be in conformity with the case of the plurality of input/output requirements as in FIG. 17 being specified.

The input requirement matching processing is performed as follows (FIG. 18A).

Step S301: acquires one service input requirement (example: format).

Step S302: acquires one input item (example: TIFF) included in the acquired input requirement.

Steps S303 and S304: determine whether the input item is included in the corresponding output requirements of the registered services for the acquired input requirement.

When the item is included (step S303/Yes), the item is stored as an evaluation object in the requirement at step S304. When the item is not included (step S303/No), this step is ignored.

Step S305: determines whether the processing of steps S302-S304 is performed for all the input items included in the input requirement. That is, when there is no other input item the processing of which is not performed (step S305/Yes), the control progresses to step S306. When there is any other input item the processing of which is not performed (step S305/No), the control is transferred to step S302.

Step S306: determines whether the processing of steps S301-S305 is performed for all the input requirements. That is, when there is no other input requirement the processing of which is not performed (step S306/Yes), the control progresses to step S307. When there is any other input requirement the processing of which is not performed (step S306/No), the control is transferred to step S301.

Step S307: generates all the combinations of the items stored as evaluation objects for each input requirement.

Step S308: treats the combinations generated at step S307 as input evaluation objects.

The output requirement matching processing is performed as follows (FIG. 18B).

Step S309: acquires one service output requirement (example: format).

Step S310: acquires one output item (example: TIFF) included in the acquired output requirement.

Steps S311 and S312: determine whether the output item is included in the corresponding input requirement of the registered services for the acquired output requirement.

When the item is included (step S311/Yes), the item is stored as an evaluation object in the requirement at step S312. When the item is not included (step S311/No), this step is ignored.

Step S313: determines whether the processing of steps S302-S312 is performed for all the output items included in the output requirement. That is, when there is no other output item the processing of which is not performed (step S313/Yes), the control progresses to step S314. When there is any other output item the processing of which is not performed (step S313/No), the control is transferred to step S310.

Step S314: determines whether the processing of steps S309-S313 is performed for all the output requirements. That is, when there is no other output requirement the processing of which is not performed (step S314/Yes), the control progresses to step S315. When there is any other output requirement the processing of which is not performed (step S314/No), the control is transferred to step S309.

Step S315: generates all the combinations of the items stored as evaluation objects for each output requirement.

Step S316: treats the combinations generated at step S315 as output evaluation objects.

The processing of the service evaluation content generation and the processing of application of the requirement performance information are the same as those of the case where a single service input/output requirement is specified.

Figure 19:
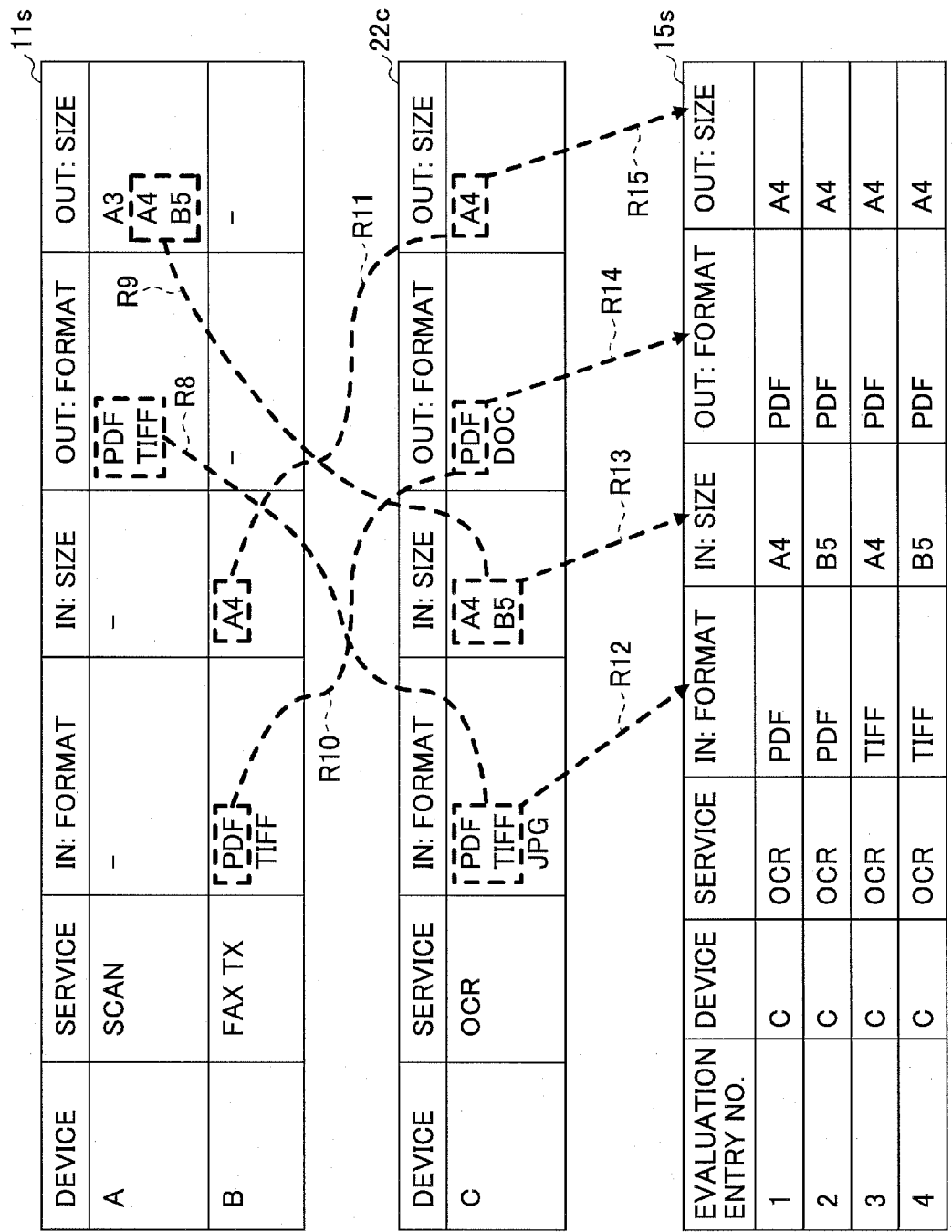
FIG. 19 is a diagram for explaining the input/output requirement matching processing when a plurality of service input/output requirements are specified.

FIG. 19 is a diagram for explaining the input/output requirement matching processing when a plurality of service input/output requirements are specified. The diagram of FIG. 19 corresponds to the input/output requirement matching processing of FIG. 10 which is modified to be in conformity with the case of the plurality of input/output requirements being specified as shown in FIG. 17.

Because PDF and TIFF are listed as a format of OUT in the registered services to the ability of the OCR service of the device (C) to receive PDF, TIFF, and JPG as the format of the input requirement, PDF and TIFF are set to the evaluation objects as the format of the input requirement (indicated by the dotted lines R8 and R12). A4 and B5 are usable as the size of the input requirement and A4 and B5 are listed as the size of the output requirement in the registered services, and A4 and B5 are set to the evaluation objects as the size of the input requirement (indicated by the dotted lines R9 and R13).

Because PDF is listed as a format of OUT in registered service to the ability to output PDF and DOC as a format of OUT, PDF is set to be an evaluation object as a format of OUT (indicated by the dotted lines R10 and R14). Although A4 and B5 can be outputted as size of OUT, since only A4 is not listed as size of OUT, A4 is set to be an evaluation object as size of OUT in registered service (indicated by the dotted lines R11 and R15).

After all the combinations of the requirements are generated as the evaluation objects by the above-described processing, there are the two input format items, the two input size items, the one output format item, and the one output size item. Hence, the four evaluation content entries (2*2*1*1=4) for the OCR service of the device (C) are generated (PDF: A4→PDF: A4, PDF: B5→PDF: A4, TIFF: A4→PDF: A4, TIFF: B5→PDF: A4). The information processing device of an embodiment of the present disclosure explained above is realized in accordance with a program which, when executed by a computer, causes the computer to perform the information processing method of an embodiment of the present disclosure.

The information processing method according to the present disclosure may be performed by the above-described association managing server 2. Alternatively, the association managing server 2 may be a general-purpose computer which executes the program stored in a computer-readable recording medium provided in the computer. Examples of the recording medium may include a CD-ROM (compact disc read only memory), an FD (flexible disk), a CD-R (compact disc recordable), a semiconductor memory, a HDD (hard disc drive), a flash memory, a RAM (random access memory), a ROM (read only memory), a FeRAM (ferroelectric random-access memory), etc.

As described in the foregoing, according to the present disclosure, it is possible to provide an information processing device, an information processing method, and a recording medium which are capable of making the evaluation process to the necessary minimum level when adding a new device to an association processing network.

The present disclosure is not limited to the specifically disclosed embodiments, and variations and modifications may be made without departing from the scope of the present disclosure.

The present application is based upon and claims the benefit of priority of the prior Japanese patent application No. 2010-260015, filed on Nov. 22, 2010, the contents of which are incorporated herein by reference in their entirety.

What is claimed is:

1. An information processing device including a processing unit to manage an association processing network formed by a plurality of image processing devices, the processing unit comprising:
   a service input/output requirement acquiring unit to acquire input/output requirements of services provided by the plurality of image processing devices;
   a service requirement performance managing unit to store requirement performance information of services registered as association objects in the network;
   a service evaluation object determining unit to perform a matching process which
      matches input/output requirements of a service of a device to be newly registered in the network with the input/output requirements of the services already registered in the network, and
      determines as an evaluation object a combination of input/output requirements used for the service from among all the input/output requirements of the service to be newly registered;
   a service evaluation content generating unit to acquire requirement performance information of the service to be newly registered from the service requirement performance managing unit, and generate an evaluation content to be evaluated for the service by including the requirement performance information in the evaluation object;
   a service evaluation unit to evaluate the evaluation content of the service from the service evaluation content generating unit according to a predetermined requirement; and
   an association object managing unit to register the service as a new association object with the evaluation content the predetermined requirement of which has been met by the evaluation of the service evaluation unit.

2. The information processing device according to claim 1, wherein the service evaluation object determining unit determines as an evaluation object item an image format which is used for the service as one of the input/output requirements.

3. The information processing device according to claim 1, wherein the service evaluation object determining unit determines as an evaluation object item an image size which is used for the service as one of the input/output requirements.

4. The information processing device according to claim 1, wherein the service evaluation object determining unit determines as the evaluation object a pattern of combinations of input requirements and output requirements which is used for the service from among all the input/output requirements.

5. The information processing device according to claim 1, wherein the service evaluation content generating unit is configured to generate, when no requirement performance information corresponding to the service to be newly registered can be acquired, an evaluation content to be evaluated for the service with the evaluation object including no requirement performance information.

6. The information processing device according to claim 1, wherein the service evaluation unit stores a corresponding test program for each service and evaluates the service by sending the evaluation content generated by the service evaluation content generating unit to the test program as a parameter and by
   performing the test program.

7. The information processing device according to claim 6, wherein the service evaluation unit stores a group of test data associated with a test program for use in the test program, the group of test data including test data used as a condition for each service requirement value in the requirement performance information, and the service evaluation unit evaluates the service by reading a corresponding test data for the test program and by performing the test program with the read test data.

8. The information processing device according to claim 1, wherein the service requirement performance managing unit is configured to set up an expiration date of each of the registered services, and the service evaluation content generating unit is configured to generate, when the expiration date of one of the registered services is reached, an evaluation content to be evaluated for said one of the registered services.

9. An information processing method for use in an information processing device including a processing unit to manage an association processing network formed by a plurality of image processing devices, the information processing method comprising:
   acquiring, by a service input/output requirement acquiring unit of the processing unit, input/output requirements of services provided by the plurality of image processing devices;
   storing, by a service requirement performance managing unit of the processing unit, requirement performance information of services registered as association objects in the network;
   performing, by a service evaluation object determining unit of the processing unit, a matching process which matches input/output requirements of a service of a device to be newly registered in the network with the input/output requirements of the services already registered in the network, to determine as an evaluation object a combination of input/output requirements used for the service from among all the input/output requirements of the service to be newly registered;
   acquiring, by a service evaluation content generating unit of the processing unit, requirement performance information of the service to be newly registered from the service requirement performance managing unit, to generate an evaluation content to be evaluated for the service by including the requirement performance information in the evaluation object;
   evaluating, by a service evaluation unit of the processing unit, the evaluation content of the service according to a predetermined requirement; and
   registering, by an association object managing unit of the processing unit, the service as a new association object with the evaluation content the predetermined requirement of which has been met in the evaluating the evaluation content.

10. A non-transitory computer-readable recording medium storing a program which, when executed by a computer, causes the computer to perform an information processing method for use in an information processing device including a processing unit to manage an association processing network formed by a plurality of image processing devices, the information processing method comprising:

acquiring, by a service input/output requirement acquiring unit of the processing unit, input/output requirements of services provided by the plurality of image processing devices;

storing, by a service requirement performance managing unit of the processing unit, requirement performance information of services registered as association objects in the network;

performing, by a service evaluation object determining unit of the processing unit, a matching process which matches input/output requirements of a service of a device to be newly registered in the network with the input/output requirements of the services already registered in the network, to determine as an evaluation object a combination of input/output requirements used for the service from among all the input/output requirements of the service to be newly registered;

acquiring, by a service evaluation content generating unit of the processing unit, requirement performance information of the service to be newly registered from the service requirement performance managing unit, to generate an evaluation content to be evaluated for the service by including the requirement performance information in the evaluation object;

evaluating, by a service evaluation unit of the processing unit, the evaluation content of the service according to a predetermined requirement; and registering, by an association object managing unit of the processing unit, the service as a new association object with the evaluation content the predetermined requirement of which has been met in the evaluating the evaluation content.

* * * * *